US011343664B2

(12) United States Patent
Huang et al.

(10) Patent No.: US 11,343,664 B2
(45) Date of Patent: May 24, 2022

(54) BLUETOOTH MESH NETWORK SYSTEM AND CONTROL METHOD HAVING CONTROL AUTHORITY SHARING MECHANISM

(71) Applicant: REALTEK SEMICONDUCTOR CORPORATION, Hsinchu (TW)

(72) Inventors: Yang Huang, Suzhou (CN); Bin Shao, Suzhou (CN); Shi-Meng Zou, Suzhou (CN); Qi Liu, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/192,925

(22) Filed: Mar. 5, 2021

(65) Prior Publication Data
US 2021/0289333 A1 Sep. 16, 2021

(30) Foreign Application Priority Data
Mar. 16, 2020 (CN) .......................... 202010183766.3

(51) Int. Cl.
*H04W 4/80* (2018.01)
*H04W 76/10* (2018.01)
*H04W 12/08* (2021.01)
*H04W 12/0433* (2021.01)
*H04W 84/18* (2009.01)

(52) U.S. Cl.
CPC ......... *H04W 4/80* (2018.02); *H04W 12/0433* (2021.01); *H04W 12/08* (2013.01); *H04W 76/10* (2018.02); *H04W 84/18* (2013.01)

(58) Field of Classification Search
CPC ....... H04W 4/80; H04W 76/10; H04W 12/08; H04W 12/0433; H04W 84/18
See application file for complete search history.

(56) References Cited

U.S. PATENT DOCUMENTS 10,932,107 B2 * 2/2021 Bae ........................ H04W 8/005

FOREIGN PATENT DOCUMENTS

CN 109951362 A 6/2019

OTHER PUBLICATIONS

OA letter of the counterpart TW application (appl. no. 109112018) dated Mar. 10, 2021. Summary of the OA letter: 1. Claims 1, 2, 4, 7, 9 and 10 are rejected as being unpatentable over the disclosure of the cited reference 1 (CN109951362A, also published as US10932107B2). 2. Claims 3 and 8 are allowed.

* cited by examiner

*Primary Examiner* — Tuan H Nguyen
(74) *Attorney, Agent, or Firm* — WPAT, PC

(57) ABSTRACT

The present invention discloses a Bluetooth mesh network system having control authority sharing mechanism that includes an original provisioner node and at least one newly added provisioner node. The original provisioner node stores control authority information related to a Bluetooth mesh network, controls the Bluetooth mesh network accordingly and performs a control authority broadcast. The newly added provisioner node receives the control authority broadcast and establishes connection with the original provisioner node according to a connection protocol. The newly added provisioner node further requests the control authority information from the original provisioner node so as to control the Bluetooth mesh network after receiving the control authority information from the original provisioner node.

10 Claims, 2 Drawing Sheets

BLUETOOTH MESH NETWORK SYSTEM AND CONTROL METHOD HAVING CONTROL AUTHORITY SHARING MECHANISM

BACKGROUND OF THE INVENTION

1. Field of the Invention

The present invention relates to a Bluetooth mesh network system and a control method having control authority sharing mechanism.

2. Description of Related Art

In the definition of Bluetooth mesh network technology, the members of the network include a provisioner node and a multiple of general nodes. The provisioner node is the administrator of the network, to administrate the events of such as, but not limited to the addition of new devices and the delivering and distribution of private keys. More specifically, the provisioner node is in charge of the management of the network.

Normally, in the Bluetooth mesh network technology, one provisioner node is disposed to control and manage the whole network. However, in practical application, a multiple devices can serve as the provisioner nodes at the same time. In some approaches, the device that originally has the authority may share the authority with other devices with one account by using cloud sharing service. However, when other devices are not able to be connected to the cloud service, or different devices have different accounts, it is difficult to share the authority.

SUMMARY OF THE INVENTION

In consideration of the problem of the prior art, an object of the present invention is to provide a Bluetooth mesh network system and a control method having control authority sharing mechanism.

The present invention discloses a Bluetooth mesh network system and having quick provisioning mechanism that includes an original provisioner node and at least one newly added provisioner node. The original provisioner node is configured to store control authority information related to the Bluetooth mesh network, control the Bluetooth mesh network according to the control authority information, and perform a control authority broadcast. The newly added provisioner node is configured to receive the control authority broadcast, and establish connection with the original provisioner node according to a connection protocol. After the newly added provisioner node establishes connection with the original provisioner node according to the connection protocol, the newly added provisioner node is further configured to request the control authority information from the original provisioner node, so as to receive the control authority information from the original provisioner node and control the Bluetooth mesh network subsequently.

The present invention also discloses a Bluetooth mesh network system control method having control authority sharing mechanism that includes the steps outlined below. Control authority information related to the Bluetooth mesh network is stored, and the Bluetooth mesh network is controlled according to the control authority information by an original provisioner node. A control authority broadcast is performed by the original provisioner node. The control authority broadcast is received, and connection is established with the original provisioner node according to a connection protocol by at least one newly added provisioner node. The control authority information is requested from the original provisioner node by the newly added provisioner node after the newly added provisioner node establishes connection with the original provisioner node according to the connection protocol. The control authority information is received from the original provisioner node and the Bluetooth mesh network is controlled subsequently by the newly added provisioner node.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a Bluetooth mesh network system and a control method having control authority sharing mechanism to allow the newly added provisioner node establishing one-to-one connection with the original provisioner node, so as to retrieve control authority information therefrom and control the Bluetooth mesh network accordingly. The sharing of the control authority becomes efficient.

Figure 1:
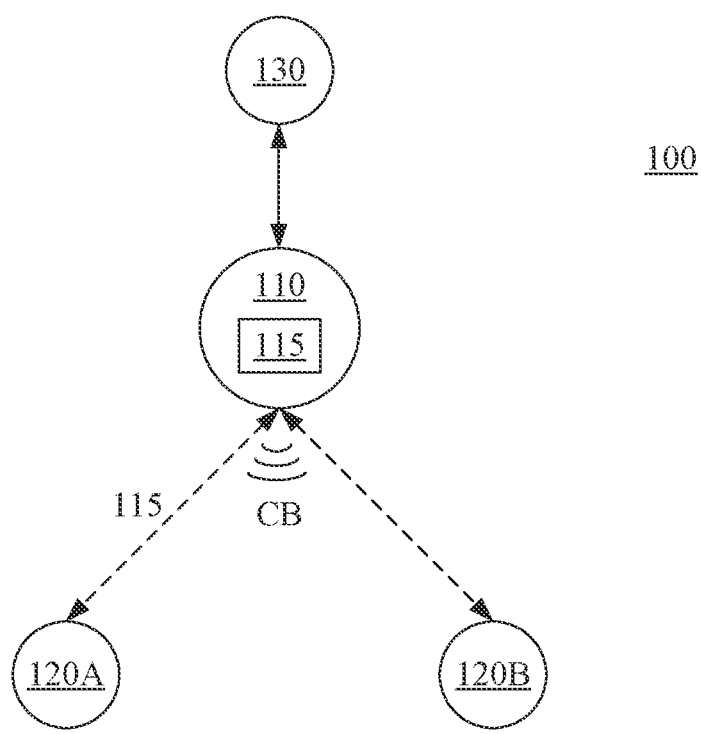
FIG. 1 illustrates a diagram of a Bluetooth mesh network system having control authority sharing mechanism according to an embodiment of the present invention.

Reference is now made to FIG. 1. FIG. 1 illustrates a diagram of a Bluetooth mesh network system 100 having control authority sharing mechanism according to an embodiment of the present invention. The Bluetooth mesh network system 100 includes an original provisioner node 110 and newly added provisioner nodes 120A and 120B.

In an embodiment, the Bluetooth mesh network system 100 further includes other nodes 130, such as a provisioner node, a relay node, a friend node, a lower power node (LPN) or a combination thereof (not illustrated) defined in Bluetooth mesh network protocol. The relay node can retransmit the received data packet to quickly spread the data packet accordingly. The low power node operates according to the power from battery and cooperates with the friend node. The friend node operates according to a main power and is able to be kept awake. The friend node can store the message supposed to be transmitted to the low power node. The low power node receives the message stored in the friend node in a reception mode, based on a pre-arranged schedule, executes a command therein, and goes back to a power-saving sleep status subsequently.

The original provisioner node 110 is configured to store control authority information 115 related to the Bluetooth mesh network 100, to control the nodes in the Bluetooth mesh network 100 according to the control authority information 115, in which the nodes can be such as, but not limited to the relay node, the friend node, the lower power node or a combination thereof described above. In an embodiment, the original provisioner node 110 can store the control authority information 115 in a storage circuit (not illustrated) therein.

In an embodiment, the control authority information 115 includes at least one private key, network configuration information or a combination thereof. The private key may include such as, but not limited to a network layer key, an application key or a combination thereof. The network layer key can be used to perform encryption of the messages in the network layer in the Bluetooth mesh network 100. The application key can be used to the accessing and controlling of different application programs executed in the Bluetooth mesh network 100. The network configuration information may include such as, but not limited to information of network address and distribution of each of the nodes in the Bluetooth mesh network 100.

As a result, the original provisioner node 110 can control the Bluetooth mesh network 100 according to the content of the control authority information 115 described above. It is appreciated that the content of the control authority information 115 described above is merely an example. In other embodiments, the control authority information 115 may include other contents of the nodes that can be used to control and manage the nodes in the Bluetooth mesh network 100.

The original provisioner node 110 is configured to perform a control authority broadcast CB by using such as, but not limited to a communication circuit (not illustrated) included therein. The packet of the control authority broadcast CB includes related information that allows the original provisioner node 110 to operate as the authority terminal of the Bluetooth mesh network 100.

At least one of the newly added provisioner nodes 120A and 120B is configured to receive the control authority broadcast CB, and establish connection with the original provisioner node 110 according to a connection protocol. Take the newly added provisioner node 120A as an example, in an embodiment, the newly added provisioner node 120A can establish a one-to-one connection according to the connection protocol through a generic attribute protocol bearer (GATT bearer) with the original provisioner node 110.

After the newly added provisioner node 120A establishes connection with the original provisioner node 110 according to the connection protocol, the newly added provisioner node 120A is further configured to request the control authority information 115 from the original provisioner node 110. After the original provisioner node 110 receives the request from the newly added provisioner node 120A, the original provisioner node 110 transmits the control authority information 115 to the newly added provisioner node 120A. After the newly added provisioner node 120A receives the control authority information 115 from the original provisioner node 110, the newly added provisioner node 120A controls the Bluetooth mesh network subsequently, according to the information of such as, but not limited to the private key, the network configuration information or a combination thereof described above.

In an embodiment, after the newly added provisioner node 120A receives the control authority information 115, the newly added provisioner node 120A accesses the control authority of the Bluetooth mesh network 100. The newly added provisioner node 120A does not need to keep connecting to the original provisioner node 110 anymore. As a result, the newly added provisioner node 120A terminates the connection with the original provisioner node 110 after the control authority information 115 is received.

It is appreciated that in the embodiments described above, the newly added provisioner node 120A is used as an example. In other embodiments, the newly added provisioner node 120B or other device nodes that wants to access the control authority can use the same method to access the control authority of the Bluetooth mesh network 100.

In a usage scenario, in addition to the device that originally has the control authority in the Bluetooth mesh network 100, other devices may be required to control the Bluetooth mesh network 100 simultaneously. In some approaches, the device that originally has the authority may share the authority with other devices with one account by using cloud sharing service. However, when other devices are connected to the cloud service, or different devices have different accounts, it is difficult to share the authority.

The Bluetooth mesh network of the present invention allows the newly added provisioner node establishing one-to-one connection with the original provisioner node, so as to retrieve control authority information therefrom and control the Bluetooth mesh network accordingly. Such a method does not require the newly added provisioner node to access an external network, and does not require the newly added provisioner node to have the same account as the original provisioner node either. The sharing of the authority becomes efficient.

It is appreciated that the number of the newly added provisioner node in the Bluetooth mesh network described above is merely an example. In other embodiments, the number of the newly added provisioner node can be any number that is one or larger than one.

Figure 2:
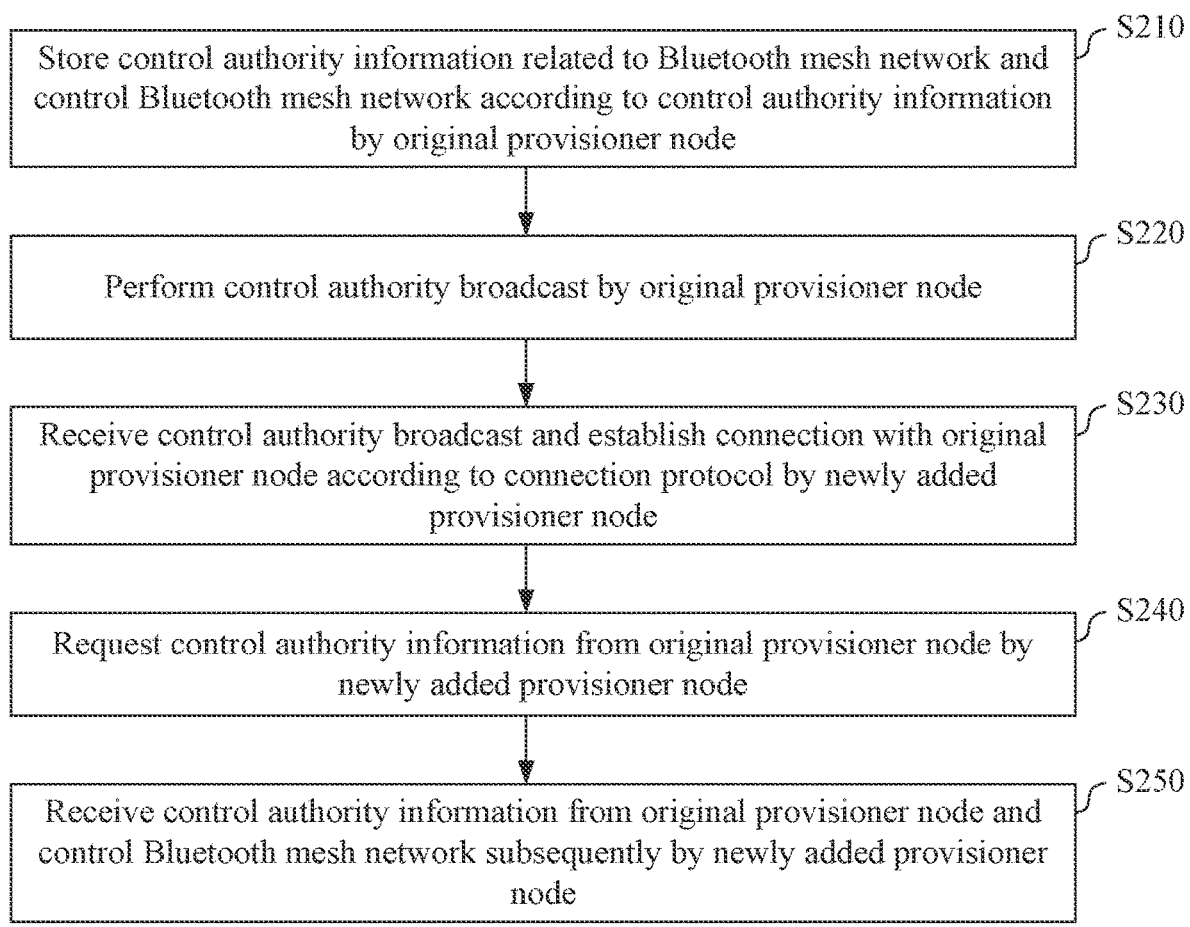
FIG. 2 illustrates a flow chart of a Bluetooth mesh network system control method having control authority sharing mechanism according to an embodiment of the present invention.

Reference is now made to FIG. 2. FIG. 2 illustrates a flow chart of a Bluetooth mesh network system control method 200 having control authority sharing mechanism according to an embodiment of the present invention.

Besides the apparatus described above, the present invention further discloses the Bluetooth mesh network system control method 200 that can be used in such as, but not limited to the Bluetooth mesh network system 100 illustrated in FIG. 1. An embodiment of the Bluetooth mesh network system control method 200 is illustrated in FIG. 2 and includes the steps outlined below.

In step S210, the control authority information 115 related to the Bluetooth mesh network 100 is stored, and the Bluetooth mesh network 100 is controlled according to the control authority information 115 by the original provisioner node 110.

In step S220, the control authority broadcast CB is performed by the original provisioner node 110.

In step S230, the control authority broadcast CB is received, and connection is established with the original provisioner node 110 according to the connection protocol by at least one newly added provisioner node, e.g. the newly added provisioner node 120A.

In step S240, the control authority information 115 is requested from the original provisioner node 110 by the newly added provisioner node 120A after the newly added provisioner node 120A establishes connection with the original provisioner node 110 according to the connection protocol.

In step S250, the control authority information 115 is received from the original provisioner node 110 and the Bluetooth mesh network 100 is controlled subsequently by the newly added provisioner node 120A.

It is appreciated that the embodiments described above are merely an example. In other embodiments, it should be appreciated that many modifications and changes may be made by those of ordinary skill in the art without departing, from the spirit of the invention.

In summary, the Bluetooth mesh network system and the control method having control authority sharing mechanism of the present invention allows the newly added provisioner node establishing one-to-one connection with the original provisioner node, so as to retrieve control authority information therefrom and control the Bluetooth mesh network accordingly. The sharing of the authority becomes efficient.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A Bluetooth mesh network system having control authority sharing mechanism, the system comprising:
    an original provisioner node configured to store control authority information related to the Bluetooth mesh network, control the Bluetooth mesh network according to the control authority information, and perform a control authority broadcast; and
    at least one newly added provisioner node configured to receive the control authority broadcast, and establish connection with the original provisioner node according to a connection protocol;
    wherein after the newly added provisioner node establishes connection with the original provisioner node according to the connection protocol, the newly added provisioner node is further configured to request the control authority information from the original provisioner node, so as to receive the control authority information from the original provisioner node and control the Bluetooth mesh network subsequently.

2. The Bluetooth mesh network system of claim 1, wherein the newly added provisioner node establishes a one-to-one connection according to the connection protocol through a generic attribute protocol bearer (GATT bearer) with the original provisioner node.

3. The Bluetooth mesh network system of claim 1, wherein the newly added provisioner node terminates the connection with the original provisioner node after the control authority information is received.

4. The Bluetooth mesh network system of claim 1, wherein the control authority information comprises at least one private key, network configuration information or a combination thereof.

5. The Bluetooth mesh network system of claim 4, wherein the private key comprises a network layer key, an application key or a combination thereof.

6. A Bluetooth mesh network system control method having control authority sharing mechanism used in a Bluetooth mesh network system, the method comprising:
    storing control authority information related to the Bluetooth mesh network, and controlling the Bluetooth mesh network according to the control authority information by an original provisioner node;
    performing a control authority broadcast by the original provisioner node;
    receiving the control authority broadcast, and establishing connection with the original provisioner node according to a connection protocol by at least one newly added provisioner node;
    requesting the control authority information from the original provisioner node by the newly added provisioner node after the newly added provisioner node establishes connection with the original provisioner node according to the connection protocol; and
    receiving the control authority information from the original provisioner node and controlling the Bluetooth mesh network subsequently by the newly added provisioner node.

7. The Bluetooth mesh network system control method of claim 6, wherein the newly added provisioner node establishes a one-to-one connection according to the connection protocol through a generic attribute protocol bearer (GATT bearer) with the original provisioner node.

8. The Bluetooth mesh network system control method of claim 6, further comprising:
    terminating the connection with the original provisioner node after the control authority information is received by the newly added provisioner node.

9. The Bluetooth mesh network system control method of claim 6, wherein the control authority information comprises at least one private key, network configuration information or a combination thereof.

10. The Bluetooth mesh network system control method of claim 9, wherein the private key comprises a network layer key, an application key or a combination thereof.

* * * * *